(12) United States Patent
Arora et al.

(10) Patent No.: US 12,476,958 B2
(45) Date of Patent: Nov. 18, 2025

(54) SYSTEM AND METHOD FOR PROVIDING DATA AUTHENTICATION FOR LONG RANGE COMMUNICATIONS

(71) Applicant: BANK OF AMERICA CORPORATION, Charlotte, NC (US)

(72) Inventors: Saurabh Arora, Gurugram (IN); Sandeep Kumar Chauhan, Miyapur Hyderabad (IN); Jagadish Reddy, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 235 days.

(21) Appl. No.: 17/739,307

(22) Filed: May 9, 2022

(65) Prior Publication Data
US 2023/0362154 A1 Nov. 9, 2023

(51) Int. Cl.
*H04L 9/40* (2022.01)
(52) U.S. Cl.
CPC ................................. *H04L 63/083* (2013.01)
(58) Field of Classification Search
None
See application file for complete search history.

(56) References Cited

U.S. PATENT DOCUMENTS

| | | | |
|---|---|---|---|
| 10,204,327 B2 * | 2/2019 | Katzin | G06Q 20/4016 |
| 10,742,674 B1 * | 8/2020 | McLinden | H04L 63/1458 |
| 11,019,063 B2 * | 5/2021 | Legault | H04L 63/102 |
| 11,062,002 B2 * | 7/2021 | Telford-Reed | H04L 63/0861 |
| 11,107,069 B2 * | 8/2021 | Hammad | G06Q 20/20 |
| 11,380,331 B1 | 7/2022 | Leong | |
| 11,429,949 B1 | 8/2022 | Oakes, III | |
| 11,430,029 B1 | 8/2022 | Sutaria | |
| 11,443,579 B2 | 9/2022 | Outwater | |
| 11,455,537 B2 | 9/2022 | Katz | |
| 11,475,044 B2 | 10/2022 | Cruanes | |
| 11,783,087 B1 * | 10/2023 | Agarwal | H04L 63/083 726/26 |
| 2004/0225627 A1 * | 11/2004 | Botros | G06F 21/55 703/22 |
| 2005/0149455 A1 * | 7/2005 | Bruesewitz | G06Q 20/40 705/64 |

(Continued)

*Primary Examiner* — Trang T Doan
(74) *Attorney, Agent, or Firm* — Moore & Van Allen PLLC; Nicholas C. Russell (57) ABSTRACT

Various systems, methods, and computer program products for providing data authentication for long range communications. The method includes receiving one or more local data processing indicators from a computing device of a user. The one or more local data processing indicators is based on historical information relating to data processing by the user. The method also includes comparing the one or more local data processing indicators to one or more server data processing indicators. The method further includes causing a transmission of an approval of a processing request in an instance in which the local data processing indicator(s) match the server data processing indicator(s). The processing request is related to the computing device of the user. The method still further includes causing a transmission of a notification of a potential malfeasant request in an instance in which the local data processing indicator(s) does not match the server data processing indicator(s).

17 Claims, 5 Drawing Sheets

(56) References Cited

U.S. PATENT DOCUMENTS

| | | | |
|---|---|---|---|
| 2009/0018940 A1* | 1/2009 | Wang | G06Q 40/00 |
| | | | 705/35 |
| 2012/0221721 A1* | 8/2012 | Bhatt | H04L 67/1008 |
| | | | 709/224 |
| 2015/0046332 A1* | 2/2015 | Adjaoute | G06Q 20/4016 |
| | | | 705/44 |
| 2016/0203490 A1* | 7/2016 | Gupta | G06Q 20/4016 |
| | | | 705/44 |
| 2019/0289013 A1* | 9/2019 | Makmel | H04L 63/0876 |
| 2020/0065813 A1* | 2/2020 | Walters | G06N 3/08 |
| 2020/0202668 A1* | 6/2020 | Cotta | G07F 17/3244 |
| 2021/0136102 A1* | 5/2021 | Bendiabdallah | H04W 88/00 |
| 2021/0174361 A1* | 6/2021 | Potireddy | G06Q 20/4016 |
| 2021/0307621 A1* | 10/2021 | Svenson | A61B 5/015 |
| 2021/0312286 A1* | 10/2021 | Shaik | G06N 3/08 |
| 2022/0261469 A1 | 8/2022 | Kalous | |
| 2022/0292088 A1 | 9/2022 | Beausoleil | |
| 2022/0300956 A1 | 9/2022 | Gonzales, Jr. | |
| 2022/0303274 A1 | 9/2022 | Cernoch | |
| 2022/0303993 A1 | 9/2022 | Adachi | |
| 2022/0311742 A1 | 9/2022 | Zuk | |
| 2022/0326690 A1 | 10/2022 | Cella | |
| 2022/0327552 A1 | 10/2022 | Gong | |
| 2022/0337612 A1 | 10/2022 | Beck | |
| 2022/0338270 A1 | 10/2022 | Deng | |
| 2022/0343324 A1 | 10/2022 | Ozvat | |
| 2022/0343341 A1 | 10/2022 | Dai Zovi | |
| 2022/0345451 A1 | 10/2022 | Hitchcock | |
| 2023/0022797 A1* | 1/2023 | Chitalia | H04L 63/083 |
| 2023/0066295 A1* | 3/2023 | Cheng | G06N 3/02 |
| 2023/0125567 A1* | 4/2023 | Hebert | H04L 63/1416 |
| | | | 726/21 |

\* cited by examiner

SYSTEM AND METHOD FOR PROVIDING DATA AUTHENTICATION FOR LONG RANGE COMMUNICATIONS

TECHNOLOGICAL FIELD

An example embodiment relates generally to data authentication and more particularly, to providing data authentication for long range communication.

BACKGROUND

Data processing can be susceptible to malfeasant actors without the necessary authentication and security. However, data authentication and security can often bog down data processing. High volume data processing takes considerable time and therefore, authentication and security review is often completed in batches after the processing is complete. Therefore, there exists a need for a system that can provide data authentication in real-time or near real-time.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for providing data authentication for long range communications is provided. The system includes at least one non-transitory storage device and at least one processing device coupled to the at least one non-transitory storage device. The at least one processing device is configured to receive one or more local data processing indicators from a computing device of a user. The one or more local data processing indicators is based on historical information relating to data processing by the user. The at least one processing device is also configured to compare the one or more local data processing indicators to one or more server data processing indicators. The at least one processing device is further configured to cause a transmission of an approval of a processing request in an instance in which the one or more local data processing indicators match the one or more server data processing indicators. The processing request is related to the computing device of the user. The at least one processing device is still further configured to cause a transmission of a notification of a potential malfeasant request in an instance in which the one or more local data processing indicators does not match the one or more server data processing indicators.

In some embodiments, the at least one processing device is further configured to receive the processing request from the computing device of the user and the processing request is a request for a transaction associated with the user. In some embodiments, the one or more local data processing indicators include information relating to one or more previous transactions by the user. In some embodiments, the one or more local data processing indicators includes information relating to a plurality of previous transaction by the user.

In some embodiments, the one or more local data processing indicators is stored at a first location and the one or more server data processing indicators is stored at a second location. In some embodiments, the first location is the memory of the computing device of the user. In some embodiments, the at least one processing device is further configured to update the one or more local data processing indicators based on the processing request.

In another example embodiment, a computer program product for providing data authentication for long range communications is provided. The computer program product includes at least one non-transitory computer-readable medium having computer-readable program code portions embodied therein. The computer-readable program code portions include an executable portion configured to receive one or more local data processing indicators from a computing device of a user. The one or more local data processing indicators is based on historical information relating to data processing by the user. The computer-readable program code portions also include an executable portion configured to compare the one or more local data processing indicators to one or more server data processing indicators. The computer-readable program code portions further include an executable portion configured to cause a transmission of an approval of a processing request in an instance in which the one or more local data processing indicators match the one or more server data processing indicators. The processing request is related to the computing device of the user. The computer-readable program code portions still further include an executable portion configured to cause a transmission of a notification of a potential malfeasant request in an instance in which the one or more local data processing indicators does not match the one or more server data processing indicators.

In some embodiments, the computer-readable program code portions also include an executable portion configured to receive the processing request from the computing device of the user and the processing request is a request for a transaction associated with the user. In some embodiments, the one or more local data processing indicators include information relating to one or more previous transactions by the user. In some embodiments, the one or more local data processing indicators include information relating to a plurality of previous transaction by the user.

In some embodiments, the one or more local data processing indicators is stored at a first location and the one or more server data processing indicators is stored at a second location. In some embodiments, the first location is the memory of the computing device of the user. In some embodiments, the computer-readable program code portions also include an executable portion configured to update the one or more local data processing indicators based on the processing request.

In still another example embodiment, a computer-implemented method for providing data authentication for long range communications is provided. The method includes receiving one or more local data processing indicators from a computing device of a user. The one or more local data processing indicators is based on historical information relating to data processing by the user. The method also includes comparing the one or more local data processing indicators to one or more server data processing indicators. The method further includes causing a transmission of an approval of a processing request in an instance in which the one or more local data processing indicators match the one or more server data processing indicators. The processing request is related to the computing device of the user. The method still further includes causing a transmission of a notification of a potential malfeasant request in an instance in which the one or more local data processing indicators does not match the one or more server data processing indicators.

In some embodiments, the method also includes receiving the processing request from the computing device of the user and the processing request is a request for a transaction associated with the user. In some embodiments, the one or more local data processing indicators include information relating to one or more previous transactions by the user. In some embodiments, the one or more local data processing indicators include information relating to a plurality of previous transaction by the user.

In some embodiments, the one or more local data processing indicators is stored at a first location and the one or more server data processing indicators is stored at a second location. In some embodiments, the first location is the memory of the computing device of the user. In some embodiments, the method also includes updating the one or more local data processing indicators based on the processing request.

Embodiments of the present disclosure address the above needs and/or achieve other advantages by providing apparatuses (e.g., a system, computer program product and/or other devices) and methods for providing data authentication for long range communication. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Having thus described embodiments of the disclosure in general terms, reference will now be made the accompanying drawings, wherein:

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data.

To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Data processing (e.g., digital payment transactions) are prone to malfeasance and require authentication measures be put in place to provide data security. For each processing request, there is a need to validate the data processing for potential malfeasance in real-time. However, this often requires high levels of data processing power and/or results in delays in processing. There exists a need for a mechanism to use device storage/processing power of user devices to assist in the authentication process.

Various embodiments of the present disclosure allow for data authentication in near real-time. The system uses distributed processing power in order to reduce processing bottlenecks. Computing devices of a user (e.g., a phone or computer) store local data processing indicators. The local data processing indicators can include information relating to one or more previous transactions made by the user. The same indicators are stored remotely (e.g., a server). Upon requesting a transaction, the computing device sends one or more data packets that include the one or more local data processing indicators which are compared with the server data processing indicators to determine whether the indicators match one another. In an instance in which the indicators do not match, potential malfeasance may be occurring, and the system can take appropriate action. The communication between the computing device of the user and the server can be achieved via LoRa communication. The local data processing indicators may be transmitted in a series of smaller data packets that reduces the processing strain on the network.

Figure 1:
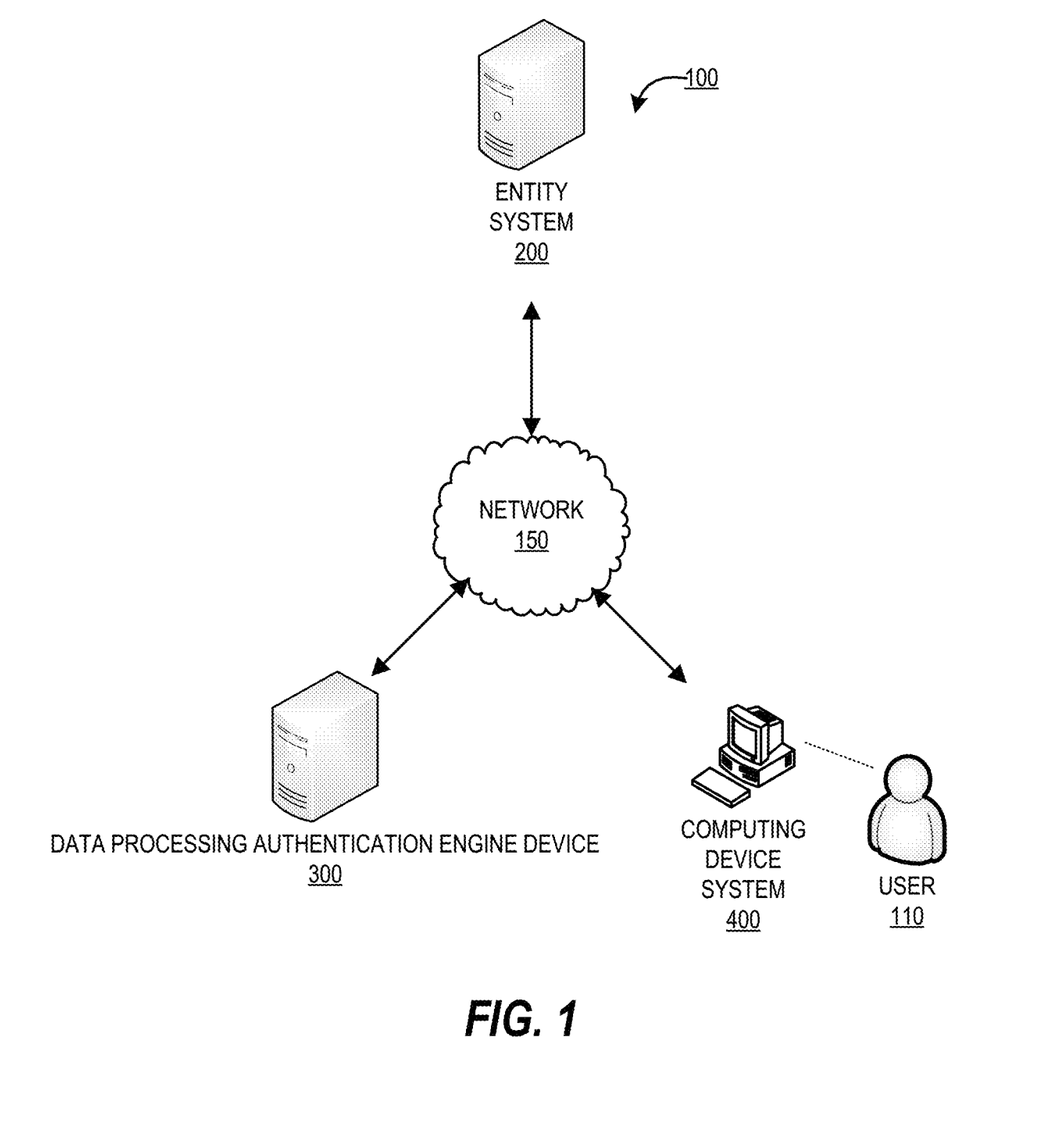
FIG. 1 provides a block diagram illustrating a system environment for providing data authentication for long range communication, in accordance with embodiments of the present disclosure.

FIG. 1 provides a block diagram illustrating a system environment 100 for providing data authentication for long range communication. As illustrated in FIG. 1, the system environment 100 includes a data processing authentication engine device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The data processing authentication engine device 300 is a system of the present disclosure for performing one or more process steps described herein. In some embodiments, the data processing authentication engine device 300 may be an independent system. In some embodiments, the data processing authentication engine device 300 may be a part of the entity system 200. For example, the methods discussed herein may be carried out by the entity system 200, the data processing authentication engine device 300, the computing device system 400, and/or a combination thereof.

The data processing authentication engine device 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. The network 150 may include one or more LoRa gateways (e.g., LoRaWAN gateway(s)) connecting the computing device systems 400 to the entity system 200 and/or the data processing authentication engine device 300. In general, the data processing authentication engine device 300 is configured to communicate information or instructions with the entity system 200, and/or the computing device system 400 across the network 150. While the entity system 200, the data processing authentication engine device 300, the computing device system 400, and server device(s) are illustrated as separate components communicating via network 150, one or more of the components discussed here may be carried out via the same system (e.g., a single system may include the entity system 200 and the data processing authentication engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the data processing authentication engine device 300, and/or entity system 200 across the network 150.

Figure 2:
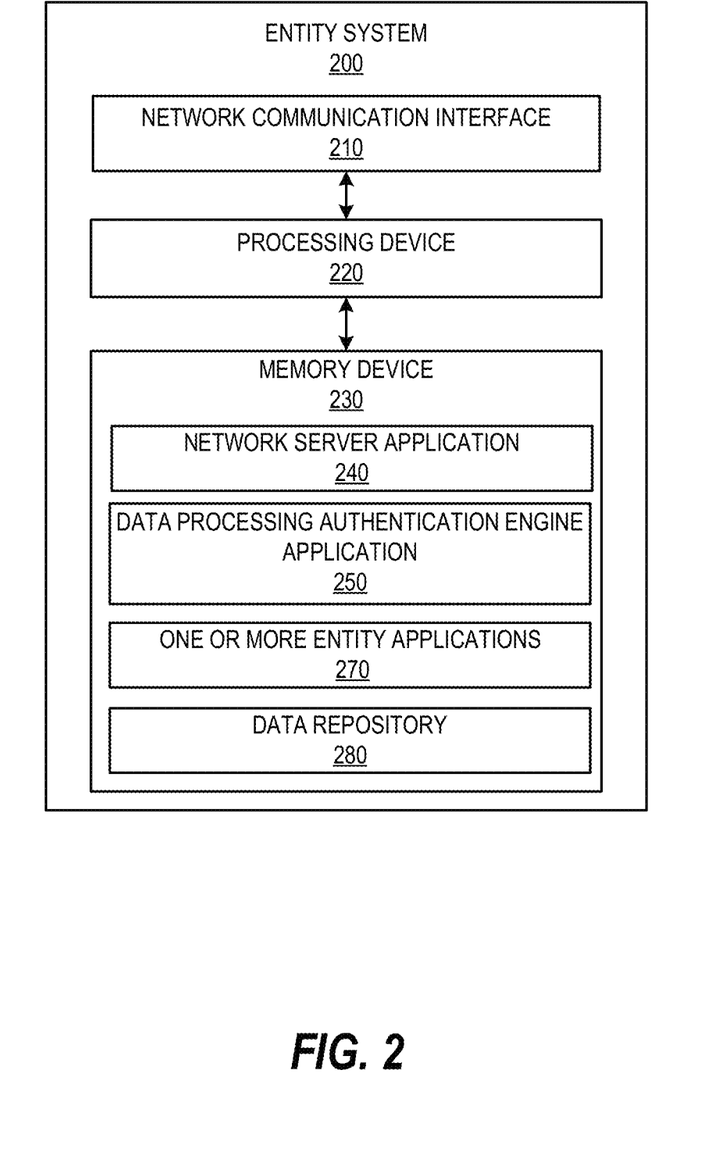
FIG. 2 provides a block diagram illustrating the entity system 200 of FIG. 1, in accordance with embodiments of the present disclosure.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a data processing authentication engine application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the data processing authentication engine application 250, the one or more entity application 270 to perform certain logic, data-extraction, and data-storing functions of the entity system 200 described herein, as well as communication functions of the entity system 200.

The network server application 240, the data processing authentication engine application 250, and the one or more entity applications 270 are configured to store data in the data repository 280 or to use the data stored in the data repository 280 when communicating through the network communication interface 210 with the data processing authentication engine device 300, and/or the computing device system 400 to perform one or more process steps described herein. In some embodiments, the entity system 200 may receive instructions from the data processing authentication engine device 300 via the data processing authentication engine application 250 to perform certain operations. The data processing authentication engine application 250 may be provided by the data processing authentication engine device 300. The one or more entity applications 270 may be any of the applications used, created, modified, facilitated, and/or managed by the entity system 200. The data processing authentication engine application 250 may be in communication with the data processing authentication engine device 300. In some embodiments, portions of the methods discussed herein may be carried out by the entity system 200.

Figure 3:
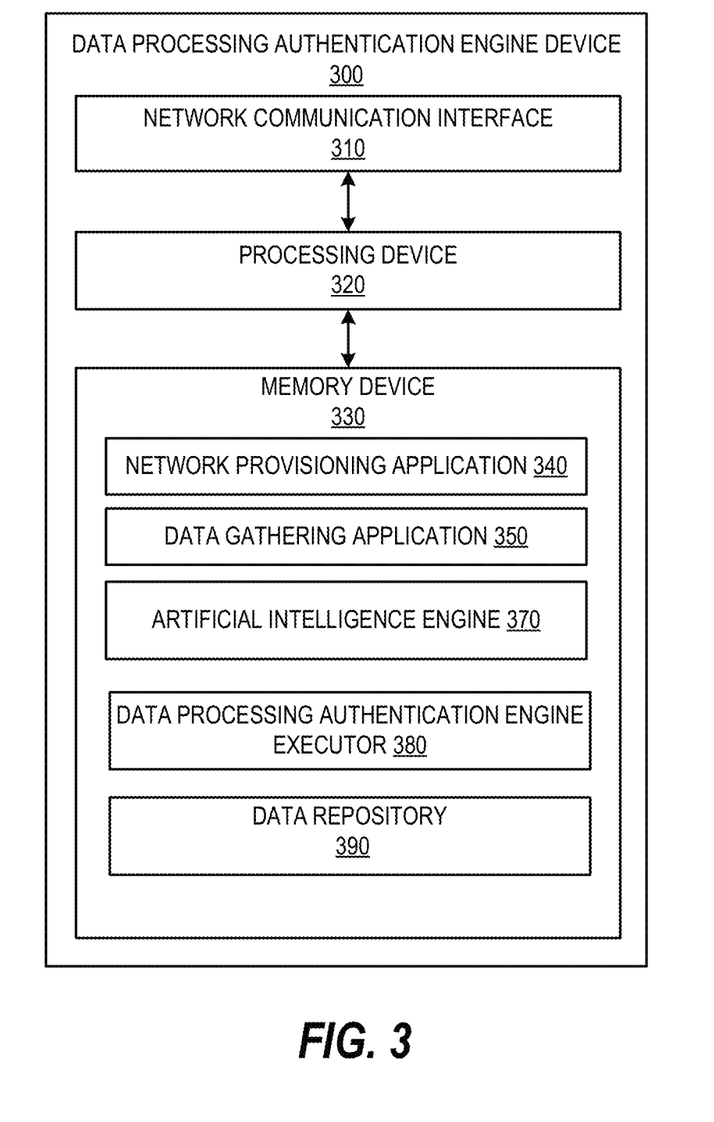
FIG. 3 provides a block diagram illustrating the data processing authentication engine device 300 of FIG. 1, in accordance with embodiments of the present disclosure.

FIG. 3 provides a block diagram illustrating the data processing authentication engine device 300 in greater detail, in accordance with various embodiments). As illustrated in FIG. 3, in one embodiment, the data processing authentication engine device 300 includes one or more processing devices 320 operatively coupled to a network communication interface 310 and a memory device 330. In certain embodiments, the data processing authentication engine device 300 is operated by an entity, such as a financial institution. In some embodiments, the data processing authentication engine device 300 is owned or operated by the entity of the entity system 200. In some embodiments, the data processing authentication engine device 300 may be an independent system. In alternate embodiments, the data processing authentication engine device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the data processing authentication engine device 300 described herein. For example, in one embodiment of the data processing authentication engine device 300, the memory device 330 includes, but is not limited to, a network provisioning application 340, a data gathering application 350, an artificial intelligence engine 370, a data processing authentication engine executor 380, and a data repository 390 comprising any data processed or accessed by one or more applications in the memory device 330. The computer-executable program code of the network provisioning application 340, the data gathering application 350, the artificial intelligence engine 370, and the data processing authentication engine executor 380 may instruct the processing device 320 to perform certain logic, data-processing, and data-storing functions of the data processing authentication engine device 300 described herein, as well as communication functions of the data processing authentication engine device 300.

The network provisioning application 340, the data gathering application 350, the artificial intelligence engine 370, and the data processing authentication engine executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the data processing authentication engine executor 380 may store the data extracted or received from the entity system 200, and the computing device system 400 in the data repository 390. In some embodiments, the network provisioning application 340, the data gathering application 350, the artificial intelligence engine 370, and the data processing authentication engine executor 380 may be a part of a single application.

Figure 4:
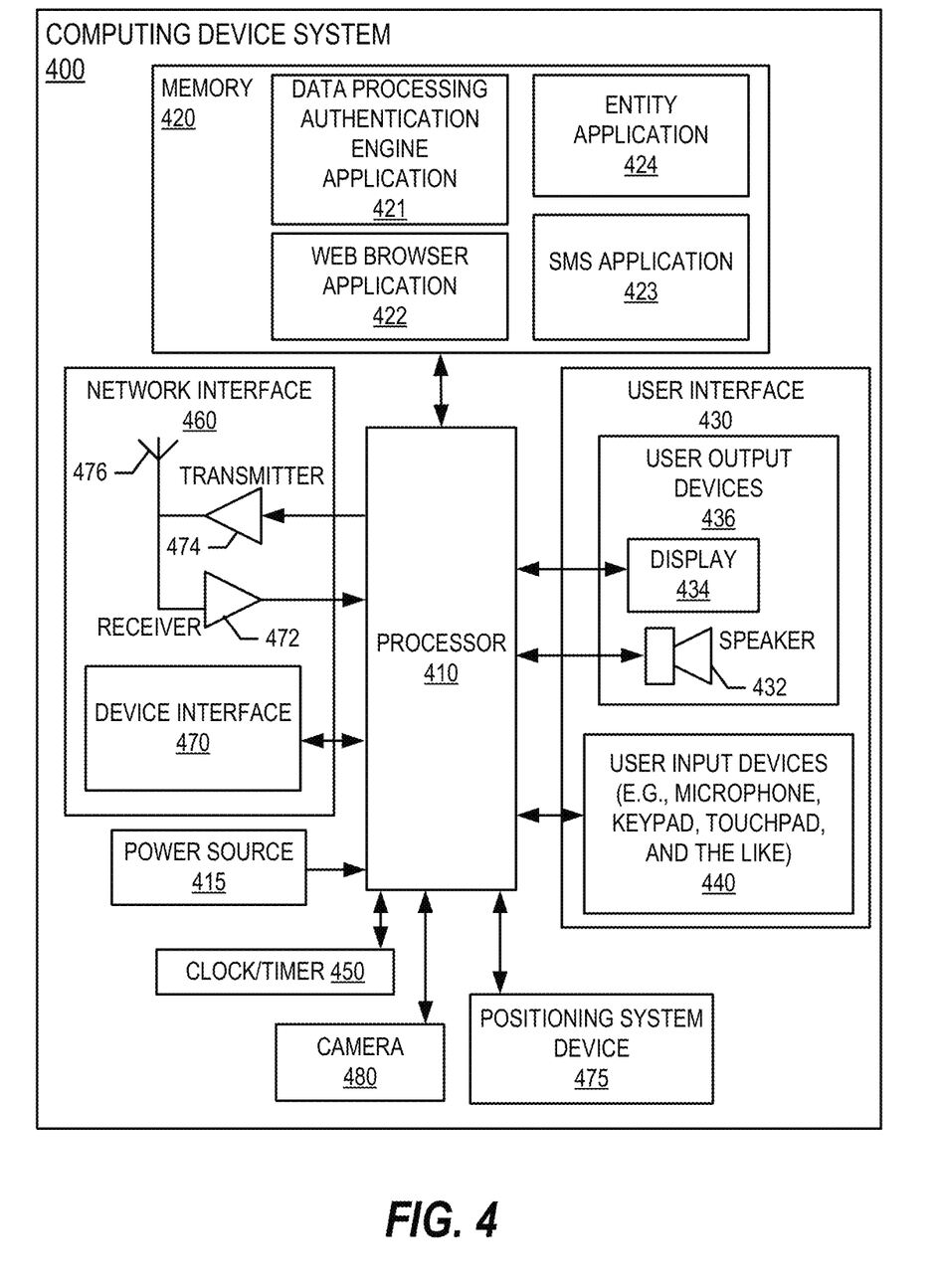
FIG. 4 provides a block diagram illustrating the computing device system 400 of FIG. 1, in accordance with embodiments of the present disclosure.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned. The computing device system 400 of various embodiments may be capable of rendering an API configuration.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a data processing authentication engine application 421, entity application 424. These applications also typically instructions to a graphical user interface (GUI) on the display 430 that allows the user 110 to interact with the entity system 200, the data processing authentication engine device 300, and/or other devices or systems. The memory 420 of the computing device system 400 may comprise a Short Message Service (SMS) application 423 configured to send, receive, and store data, information, communications, alerts, and the like via the network 150. In some embodiments, the data processing authentication engine application 421 provided by the data processing authentication engine device 300 allows the user 110 to access the data processing authentication engine device 300. In some embodiments, the entity application 424 provided by the entity system 200 and the data processing authentication engine application 421 allow the user 110 to access the functionalities provided by the data processing authentication engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
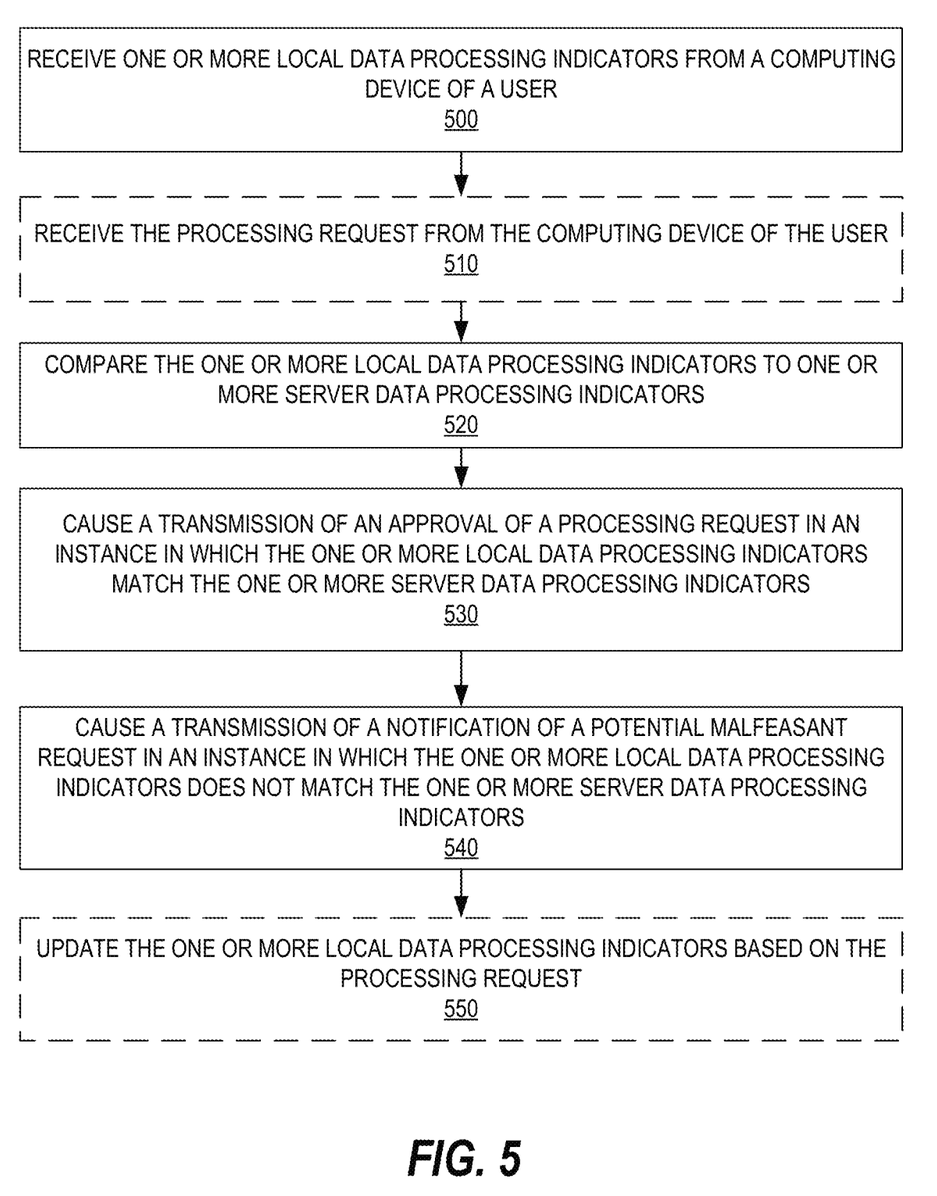
FIG. 5 illustrates a flow chart of the method of providing data authentication for long range communication in accordance with an embodiment of the present disclosure.

FIG. 5 illustrates another example method of providing data authentication for long range communication. The method may be carried out by a system discussed herein (e.g., the entity system 200, the data processing authentication engine device 300, the computing device system 400). An example system may include at least one non-transitory storage device and at least one processing device coupled to the at least one non-transitory storage device. In such an embodiment, the at least one processing device is configured to carry out the method discussed herein.

Referring now to Block 500 of FIG. 5, the method includes receiving one or more local data processing indicators from a computing device of a user. The one or more local data processing indicators is based on historical information relating to data processing by the user. The one or more local data processing indicators include information relating to one or more previous transactions by the user. For example, the five previous transactions by the user may be stored on the computing device of the user. Five previous transactions is merely an example amount of processing requests that are stored. The exact amount stored by a system may be based on various factors, such as memory capacity, security level, processing power, and/or the like. In various embodiments, the one or more local data processing indicators include information relating to a plurality of previous transaction by the user. The one or more local data processing indicators may be stored locally on the computing device of the user. The local data processing indicators may include information relating to previous transaction, such as transaction initiation location, amount of previous transaction, destination account, and/or time of previous transaction.

The local data processing indicators may be received from a computing device system 400 associated with the user 110. The computing device system 400 may transmit the local data processing indicators via network 150. For example, the computing device system 400 may transmit the local data processing indicators to the entity system 200 and/or the data processing authentication engine device 300 via one or more LoRaWAN gateways.

The system may receive the local data processing indicators in the form of smaller data packets that each include one or more local data processing indicators. For example, for a single previous transaction, the system may receive multiple data packets that each include information relating to the previous transaction (e.g., a first data packet may include the transaction identifier corresponding to a previous transaction and the transaction destination, while a second data packet may include the same transaction identifier corresponding to a previous transaction and the transaction amount). As such, the system may receive multiple data packets that are used in the method herein as local data processing indicators.

Referring now to optional Block 510 of FIG. 5, the method includes receiving the processing request from the computing device of the user. The processing request is related to the computing device of the user. The processing request is a request for a transaction associated with the user. The processing request may include information relating to the request transaction, such as transaction amount, transaction location, destination account, and/or the like. The processing request may be received from the computing device of the user. The processing request may be received with the one or more local data processing indicators.

In an instance in which a user 110 has multiple computing device systems 400, the system may receive the local data processing indicators stored on the given computing device system associated with the user 110 that is sending the processing request (e.g., initiating the transaction). In some embodiments, the system may analyze the local data processing indicators as detailed herein. For example, the system may compare the local data processing indicators received from the given computing device system to the server data processing indicators that correspond to said transactions.

In some instances, the local data processing indicators may be shared across multiple computing device systems associated with the user 110. For example, a first computing device system associated with the user 110 may receive local data processing indicators from a second computing device system associated with the user 110 (e.g., via the network 150). As such, the local data processing indicators may include previous transactions across multiple computing device systems 400 associated with the user 110.

Referring now to Block 520 of FIG. 5, the method includes comparing the one or more local data processing indicators to one or more server data processing indicators. The server data processing indicators may be the same as the local data processing indicators. As such, the server data processing indicator(s) are based on historical information relating to data processing by the user. The server data processing indicator(s) may be collected and stored at the same time as the local data processing indicator(s) are collected and stored by the computing device of the user. The one or more server data processing indicators include information relating to one or more previous transactions by the user. The one or more server data processing indicators and the one or more local data processing indicators should be the same in an instance in which the computing device is associated with the user. The one or more local data processing indicators is stored at a first location (e.g., memory of the computing device of the user) and the one or more server data processing indicators is stored at a second location (e.g., a server).

The server data processing indicators may also include information relating to the computing device system 400 associated with the user 110 that initiated the data processing of a given data processing. For example, the server data processing indicator may indicate that the user 110 transmitted a first processing request (e.g., a transaction request) from a mobile device and a second processing request from a computer. As such, the system may be capable of comparing one or more local data processing indicators from a given computing device system 400 to one or more server data processing indicators corresponding to processing request from the same computing device system 400.

Referring now to Block 530 of FIG. 5, the method includes causing a transmission of an approval of a processing request in an instance in which the one or more local data processing indicators match the one or more server data processing indicators. The approval indicates that the one or more local data processing indicators matches the one or more server data processing indicators and therefore there is not indication of malfeasant activity. The system may also cause the transaction request to be executed.

Referring now to Block 540 of FIG. 5, the method includes causing a transmission of a notification of a potential malfeasant request in an instance in which the one or more local data processing indicators does not match the one or more server data processing indicators. The system may decline a transaction (e.g., cause a notification of a rejection of the transaction request).

The system may also request additional authentication steps in an instance in which the one or more local data processing indicators does not match the one or more server data processing indicators. In some instances, the local data processing indicators may not match the server data processing indicators for various reasons that are not malfeasant (e.g., the user 110 may be using a new computing device system 400 that does not have the complete local data processing indicators). As such, the system may request additional authentication steps, such as two-factor authentication or other stepped-up authentication methods. In some embodiments, the processing request may be approved (e.g., the operations of Block 530 discussed above) in an instance in which the additional authentication steps are satisfied.

Referring now to Block 550 of FIG. 5, the method includes updating the one or more local data processing indicators based on the processing request. The server data processing indicators may also be updated based on the processing request. In an instance in which the processing request is approved, the local data processing indicator(s) and the server data processing indicator(s) may be updated to include information relating to the transaction stemming from the transaction request. In various embodiments, the system may store information relating to a set number of previous transactions, such that the local data processing indicators and the server data processing indicators are representative of a set number of transactions. For example, the local data processing indicators and the server data processing indicators may include information for the previous five transactions. As such, the local data processing indicators and the server data processing indicators may be updated with each subsequent purchase (e.g., adding a new transaction and/or erasing older transactions).

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for providing data authentication for long range communications, the system comprising:
   at least one non-transitory storage device; and
   at least one processing device coupled to the at least one non-transitory storage device, wherein the at least one processing device is configured to:
      receive, from multiple computing devices of a user, a plurality of local data processing indicators, wherein the plurality of data processing indicators are requests for a transaction associated with the user occurring in real time, wherein the plurality of local data processing indicators comprise historical information relating to a plurality of data processing transactions from the multiple computing devices by the user and wherein the plurality of local data processing indicators are split into multiple smaller data packets and are transmitted across one or more network gateways associated with a single data processing transaction of the user, wherein the data packets comprise transaction identifiers, transaction initiation location, transaction destination, and transaction amounts;
      compare the plurality of local data processing indicators to a plurality of server data processing indicators, wherein the one or more local data processing indicators is stored at a first location and the one or more server data processing indicators is stored at a second location, wherein the transaction initiation location of the plurality of local data processing indicators is compared to the transaction initiation locations of previous transactions by the user; and
      in an instance in which the plurality of local data processing indicators does not match the plurality of server data processing indicators, cause a transmission of a notification of a potential malfeasant request and a transmission of a rejection of a processing transaction request of the user.

2. The system of claim 1, wherein the at least one processing device is further configured to receive the processing request from the computing device of the user, wherein the processing request is a request for a transaction associated with the user.

3. The system of claim 1, wherein the one or more local data processing indicators comprise information relating to one or more previous transactions by the user.

4. The system of claim 1, wherein the one or more local data processing indicators comprises information relating to a plurality of previous transaction by the user.

5. The system of claim 1, wherein the first location is a memory of the computing device of the user.

6. The system of claim 1, wherein the at least one processing device is further configured to update the one or more local data processing indicators based on the processing request.

7. A computer program product for providing data authentication for long range communications, the computer program product comprising at least one non-transitory computer-readable medium having computer-readable program code portions embodied therein, the computer-readable program code portions comprising:
   an executable portion configured to receive, from multiple computing devices of a user, a plurality of local data processing indicators, wherein the plurality of data processing indicators are requests for a transaction associated with the user occurring in real time, wherein the plurality of local data processing indicators comprise historical information relating to a plurality of data processing transactions from the multiple computing devices by the user and wherein the plurality of local data processing indicators are split into multiple smaller data packets and are transmitted across one or more network gateways associated with a single data processing transaction of the user, wherein the data packets comprise transaction identifiers, transaction initiation location, transaction destination, and transaction amounts;
   an executable portion configure to compare the plurality of local data processing indicators to a plurality of server data processing indicators, wherein the one or more local data processing indicators is stored at a first location and the one or more server data processing indicators is stored at a second location, wherein the transaction initiation location of the plurality of local data processing indicators is compared to the transaction initiation locations of previous transactions by the user; and
   an executable portion configured to cause a transmission of a notification of a potential malfeasant request in an instance in which the plurality of data processing indicators and a transmission of a rejection of a processing transaction request of the user.

8. The computer program product of claim 7, further comprising an executable portion configured to receive the processing request from the computing device of the user, wherein the processing request is a request for a transaction associated with the user.

9. The computer program product of claim 7, wherein the one or more local data processing indicators comprise information relating to one or more previous transactions by the user.

10. The computer program product of claim 7, wherein the one or more local data processing indicators comprises information relating to a plurality of previous transaction by the user.

11. The computer program product of claim 7, wherein the first location is a memory of the computing device of the user.

12. The computer program product of claim 7, further comprising an executable portion configured to update the one or more local data processing indicators based on the processing request.

13. A computer-implemented method for providing data authentication for long range communications, the method comprising:

receiving, from multiple computing devices of a user, a plurality of local data processing indicators, wherein the plurality of data processing indicators are requests for a transaction associated with the user occurring in real time, wherein the plurality of local data processing indicators comprise historical information relating to a plurality of data processing transactions from the multiple computing devices by the user and wherein the plurality of local data processing indicators are split into multiple smaller data packets and are transmitted across one or more network gateways associated with a single data processing transaction of the user, wherein the data packets comprise transaction identifiers, transaction initiation location, transaction destination, and transaction amounts;

comparing the plurality of local data processing indicators to a plurality of server data processing indicators, wherein the one or more local data processing indicators is stored at a first location and the one or more server data processing indicators is stored at a second location, wherein transaction initiation location of the plurality of local data processing indicators is compared to transaction initiation locations of five previous transactions by the user; and in an instance in which the plurality of local data processing indicators does not match the plurality of server data processing indicators, causing a transmission of a notification of a potential malfeasant request and a transmission of a rejection of a processing transaction request of the user.

14. The method of claim 13, further comprising receiving the processing request from the computing device of the user, wherein the processing request is a request for a transaction associated with the user.

15. The method of claim 13, wherein the one or more local data processing indicators comprise information relating to one or more previous transactions by the user.

16. The method of claim 13, wherein the one or more local data processing indicators comprises information relating to a plurality of previous transaction by the user.

17. The method of claim 13, further comprising updating the one or more local data processing indicators based on the processing request.

\* \* \* \* \*